(12) United States Patent
Beyers

(10) Patent No.: US 8,321,733 B2
(45) Date of Patent: Nov. 27, 2012

(54) OPTIMIZATION OF SERDES SAMPLING PARAMETERS

(75) Inventor: Timothy M. Beyers, San Francisco, CA (US)

(73) Assignee: Finisar Corporation, Sunnyvale, CA (US)

( * ) Notice: Subject to any disclaimer, the term of this patent is extended or adjusted under 35 U.S.C. 154(b) by 1261 days.

(21) Appl. No.: 12/103,431

(22) Filed: Apr. 15, 2008

(65) Prior Publication Data

US 2008/0253293 A1 Oct. 16, 2008

Related U.S. Application Data

(60) Provisional application No. 60/912,106, filed on Apr. 16, 2007.

(51) Int. Cl.
*H04L 1/00* (2006.01)
(52) U.S. Cl. ......... 714/746; 714/715; 714/712; 370/242
(58) Field of Classification Search .................. 714/715, 714/712; 702/120; 370/242; 709/223, 224
See application file for complete search history.

(56) References Cited

U.S. PATENT DOCUMENTS

| | | | |
|---|---|---|---|
| 6,438,376 B1* | 8/2002 | Elliott et al. | 455/437 |
| 6,526,532 B1* | 2/2003 | Cinkler et al. | 714/712 |
| 7,657,807 B1* | 2/2010 | Watkins et al. | 714/727 |
| 2004/0054776 A1* | 3/2004 | Klotz et al. | 709/224 |
| 2004/0064774 A1* | 4/2004 | Fabry et al. | 714/742 |
| 2006/0165076 A1* | 7/2006 | Rittmeyer et al. | 370/389 |
| 2006/0200711 A1* | 9/2006 | Schondelmayer et al. | 714/712 |
| 2007/0011488 A1* | 1/2007 | Orii | 714/5 |
| 2007/0258478 A1* | 11/2007 | Wu et al. | 370/437 |
| 2007/0263649 A1* | 11/2007 | Cuni et al. | 370/412 |

OTHER PUBLICATIONS

Sunter, "Structural Tests for Jitter Tolerance in SerDes Receivers", 2005, IEEE, pp. 1-10.*

* cited by examiner

*Primary Examiner* — Scott Baderman
*Assistant Examiner* — Jeison C Arcos
(74) *Attorney, Agent, or Firm* — Maschoff Gilmore & Israelsen

(57) ABSTRACT

One or more modules configured to cause a network diagnostic component to perform the following: an act of selecting first specific sampling parameters at which the SERDES is to receive network traffic; an act of determining a number of errors included in a signal output by the SERDES at the selected first specific sampling parameters; an act of repeating for a specified number of the remaining sampling parameters the acts of selecting specific sampling parameters and determining the number of errors in a signal output by the SERDES at the selected specific sampling parameter; an act of recording the number of errors for each selected specific sampling parameter in an output record, and an act of applying an optimization solution on the output record to thereby determine the specific sampling parameters that will cause the SERDES to output a signal with the lowest value of errors.

20 Claims, 7 Drawing Sheets

| A\B | 04 | 05 | 06 | 07 | 08 | 09 | 0A | 0B | 0C | 0D | 0E | 0F | 10 | 11 | 12 | 13 | 14 | 15 | 16 | 17 | 18 | 19 | 1A | 1B |
|---|---|---|---|---|---|---|---|---|---|---|---|---|---|---|---|---|---|---|---|---|---|---|---|---|
| 04: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 05: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 06: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 07: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 08: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 09: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0A: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0B: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0C: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0D: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0E: | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 | E8 |
| 0F: | E8 | E8 | E8 | E8 | E8 | E8 | E8 | E7 | E8 | E7 | E7 | E8 | E8 | E8 | E8 | E8 | E8 | E8 | E8 | E8 | E8 | E8 | E8 | E8 |
| 10: | E8 | E8 | E8 | E8 | E8 | E8 | E7 | E6 | E6 | E6 | E7 | E8 | E8 | E8 | E8 | E8 | E8 | E8 | E8 | E8 | E8 | E8 | E8 | E8 |
| 11: | E8 | E8 | E8 | E8 | E8 | E8 | E7 | E6 | E4 | E4 | E6 | E8 | E8 | E8 | E8 | E8 | E8 | E8 | E8 | E8 | E8 | E8 | E8 | E8 |
| 12: | E8 | E8 | E8 | E8 | E8 | E8 | E7 | E4 | E4 | E6 | E7 | E8 | E8 | E8 | E8 | E8 | E8 | E8 | E8 | E8 | E8 | E8 | E8 | E8 |
| 13: | E8 | E8 | E8 | E8 | E8 | E8 | E6 | E4 | E4 | E7 | E8 | E8 | E8 | E8 | E8 | E8 | E8 | E8 | E8 | E8 | E8 | E8 | E8 | E8 |
| 14: | E8 | E8 | E8 | E8 | E8 | E8 | E7 | E6 | E4 | E6 | E7 | E8 | E8 | E8 | E8 | E8 | E8 | E8 | E8 | E8 | E8 | E8 | E8 | E8 |
| 15: | E8 | E8 | E8 | E8 | E8 | E8 | E7 | E4 | E5 | E7 | E8 | E8 | E8 | E8 | E8 | E8 | E8 | E8 | E8 | E8 | E8 | E8 | E8 | E8 |
| 16: | E8 | E8 | E8 | E8 | E8 | E8 | E7 | E4 | E6 | E8 | E8 | E8 | E8 | E8 | E8 | E8 | E8 | E8 | E8 | E8 | E8 | E8 | E8 | E8 |
| 17: | E8 | E8 | E8 | E8 | E8 | E8 | E7 | E4 | E7 | E8 | E8 | E8 | E8 | E8 | E8 | E8 | E8 | E8 | E8 | E8 | E8 | E8 | E8 | E8 |
| 18: | E8 | E8 | E8 | E8 | E8 | E8 | E7 | E6 | E7 | E8 | E8 | E8 | E8 | E8 | E8 | E8 | E8 | E8 | E8 | E8 | E8 | E8 | E8 | E8 |
| 19: | E8 | E8 | E8 | E8 | E8 | E8 | E7 | E7 | E8 | E8 | E9 | E8 | E8 | E8 | E8 | E8 | E8 | E8 | E8 | E8 | E8 | E8 | E8 | E8 |
| 1A: | E8 | E8 | E8 | E8 | E8 | E8 | E7 | E7 | E8 | E9 | E9 | E8 | E8 | E8 | E8 | E8 | E8 | E8 | E8 | E8 | E8 | E8 | E8 | E8 |
| 1B: | E8 | E8 | E8 | E8 | E8 | E8 | E7 | E7 | E8 | E8 | E9 | E8 | E8 | E8 | E8 | E8 | E8 | E8 | E8 | E8 | E8 | E8 | E8 | E8 |

OPTIMIZATION OF SERDES SAMPLING PARAMETERS

CROSS-REFERENCE TO RELATED APPLICATIONS

This application claims the benefit of U.S. Provisional Application No. 60/912,106, filed Apr. 16, 2007, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANs")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate systems and methods for optimizing a plurality of sampling parameters of a Serializer/Deserializer (SERDES) included in a network diagnostic component. The systems and methods include one or more modules configured to cause the network diagnostic component to perform the following: an act of selecting first specific sampling parameters of the plurality of sampling parameters at which the SERDES is to receive network traffic; an act of determining a number of errors included in a signal output by the SERDES at the selected first specific sampling parameters; an act of repeating for a specified number of the remaining sampling parameters of the plurality of sampling parameters the acts of selecting specific sampling parameters and determining the number of errors in a signal output by the SERDES at the selected specific sampling parameter, wherein the selected specific sampling parameters are different from previously selected specific sampling parameters; an act of recording the number of errors for each selected specific sampling parameter in an output record, and an act of applying an optimization solution on the output record to thereby determine the specific sampling parameters of the plurality of sampling parameters that will cause the SERDES to output a signal with the lowest value of errors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 illustrates an embodiment of an output record generated in accordance with the principles of the present invention;

FIG. 3 illustrates an alternative embodiment of an output record generated in accordance with the principles of the present invention.

DETAILED DESCRIPTION

The principles of the present invention relate to systems and methods for optimizing the signal reception of a network diagnostic component. As referred to herein, a network diagnostic component is a diagnostic device configured to receive network traffic sent by another device and to perform one or more network diagnostic functions on the network traffic. The diagnostic component may be placed in-line between two or more devices in order to monitor the network traffic between the two devices. Alternatively, the network diagnostic device may monitor the network traffic of a single device. Common examples of network diagnostic components include, but are not limited to, protocol or network analyzers, bit error rate testers, generators, monitors, load testers, and jammers.

Figure 1:
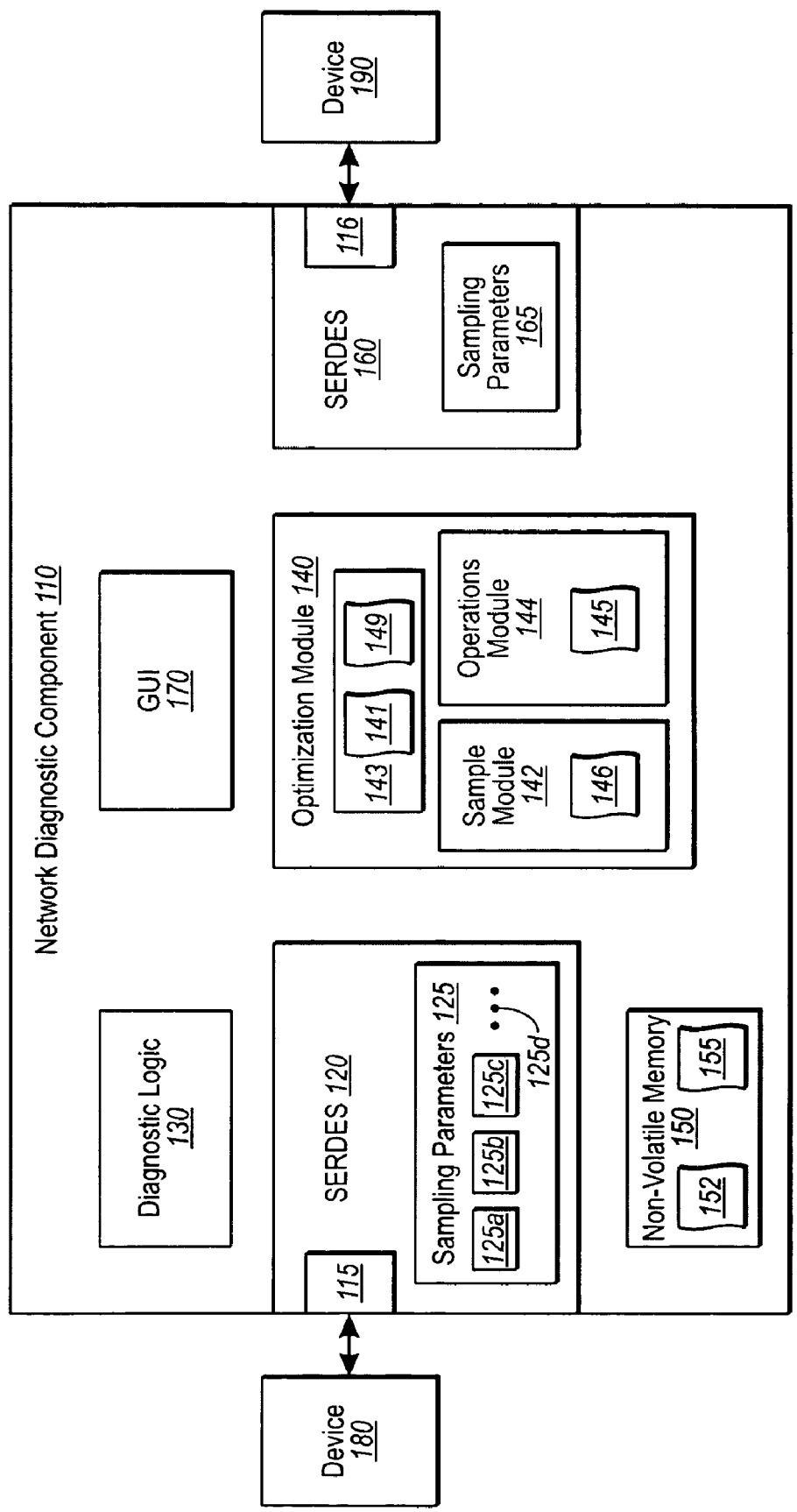
FIG. 1 illustrates a block diagram of a network diagnostic component in accordance with the principles of the present invention.

Referring now to FIG. 1, a network diagnostic component 110 is illustrated. Network diagnostic component 110 may be any type of network diagnostic component. As illustrated, network diagnostic component 110 may be coupled to a node or device 180, which may be a server or host; a client or storage device; a switch; a hub; a router; all or a portion of a SAN fabric; a diagnostic device; and any other device or system, or combination thereof, that may be coupled to network diagnostic component 110. In some embodiments, device 180 may also be a fixed transmitter that is used during an optimization process at manufacture time. Also note, as mentioned above, that network diagnostic component 110 may also be coupled to a device 190 and thus sit in-line between devices 180 and 190.

As illustrated, network diagnostic component 110 includes a port or connector 115 that acts as the physical connection between network diagnostic component 110 and device 180. In some embodiments, connector 115 may be a RJ-45-connector or a mini-SAS 4x (SFF-8088) connector, although any reasonable connector may be implemented. Connected to the connector 115 is a Serializer/Deserializer (SERDES) 120, which may be any reasonable SERDES known in the art. In operation, the SERDES 120 is configured to receive the asynchronous serial network data via connector 115. The inputted asynchronous serial data may then be output by SERDES 120 synchronously as parallel data with a control signal and clock which is sent to diagnostic logic 130. The SERDES 120 may also perform various clocking functions on the received signal as is known in the art. The SERDES 120 is further configured to provide at least a portion of the received network traffic to diagnostic logic 130, which may be any combination of hardware and software configured to perform diagnostic functions on the network traffic.

SERDES 120 includes one or more sampling parameters 125 illustrated as sampling parameters 125a, 125b, 125c, and an ellipses 125d that represents that there may be any number of additional sampling parameters. The sampling parameters 125 may be configured to at least partially effect how SERDES 120 samples (i.e., performs clocking functions and the like) the received network traffic or signal. For example, at each different sampling parameter, a different error rate of the network traffic will typically be measured by SERDES 120. The sampling parameters 125 include sampling position of the clock and may also be any reasonable sampling parameters known to those of skill in the art.

As may be appreciated, no two SERDES 120 are exactly alike. This is often due to variations found in the SERDES 120 produced by different manufacturers. In addition, due to material differences or silicon process variations, even SERDES 120 produced by the same manufacturer may also be different. This often leads to the same sampling parameters of each individual SERDES 120 causing a signal output from the SERDES to exhibit a different bit error rate. Accordingly, it would be useful to determine in each individual SERDES 120 the sampling parameters that caused the lowest value of network traffic error to be present. Advantageously, the principles of the present invention allow for the optimization of the sampling parameters.

In one embodiment, the optimization process may be performed by the manufacturer of network diagnostic component 110 in the factory at the time of manufacture. In other embodiments, the optimization process may be performed while the network diagnostic component 110 is in operation.

Referring again to FIG. 1, it is shown that network diagnostic component 110 includes an optimization module 140. The optimization module 140 is configured to optimize the performance of network diagnostic component 110 by determining the specific sampling parameters 125 that will cause SERDES 120 to output a signal with the lowest value of errors as will be explained in more detail to follow. Advantageously, this allows network diagnostic component 110 to make better diagnostic measurements of the received network traffic.

The optimization module 140 includes various modules 142 and 144 that are configured to help optimization module 140 perform its functions as will be explained in more detail to follow. Although illustrated as including two modules, it will be appreciated that the principles of the present invention anticipate an optimization module 140 that includes more or less than this number of modules. The optimization module 140, as well as any of the modules that comprise optimization module 140, may be implemented as hardware, software, or any combination of hardware and software. Note that although optimization module 140 is shown as a separate module, this is for ease of viewing only. Those of skill in the art will appreciate that optimization module may be a stand alone module or it may be part of another module or component of network diagnostic component 110. Further, although modules 142 and 144 are shown as being separate modules, this also is for ease of viewing as it will be appreciated that these modules may be implemented as a single module, separate modules, or any subset thereof.

As is understood in the art, a signal that is received by SERDES 120 consists of a string of bits that transition from a logical one to a logical zero and transitions from a logical zero to a logical one. It is desirable to sample a signal that is to be interpreted as a one or as a zero as the center of a bit period. Accordingly, it is desirable to determine the sampling parameters 125 that cause SERDES 120 to sample the signal at the center of the bit period will help the signal output by SERDES 120 exhibit the lowest bit error rate. As will be appreciated, having SERDES 120 provide a signal with the lowest value of errors possible to diagnostic logic 130 helps network diagnostic component 110 to provide a user with a more accurate diagnostic result.

During the optimization process, optimization module 140 may apply one or more optimization solutions to find the optimum sampling parameters that will cause the signal output from SERDES 120 to diagnostic logic 130 to contain the lowest value of errors. Several specific embodiments of the optimization process will now be explained.

Center of Mass Embodiment

In one embodiment, sample module 142 may be configured to direct SERDES 120 to receive the network traffic signal provided by device 180 at first specified sampling parameters such as sampling parameters 125*a*. Note that any reference herein to specified sampling parameters is meant to cover any number of sampling parameters. For example, in some embodiments, reference to sampling parameters may mean only one sampling parameter, while in other embodiments it may mean more than one sampling parameter.

Sample module 142 may then determine if the network traffic received at SERDES 120 is compliant with a known code scheme 146 associated with the protocol of the received network traffic. For example, the Fibre Channel protocol uses 8B/10B encoding. Accordingly, sample module 142 may examine the received network traffic in 10 bit code word increments at sampling parameter 125*a*. If the 10 bit code word is not compliant with the 8B/10B code scheme, then an error is determined to have occurred. In other words, if a 10 bit code word arrives that does not have a valid entry in the code book 146, then an error is determined to have occurred. An error is also determined to have occurred if a running disparity error is found in the received network traffic. Although a specific example has been shown using the Fibre Channel protocol, the principles of the present invention also apply to other protocols with other coding schemes. It will also be appreciated that the number of errors may also be determined by comparing the received signal pattern with a known signal pattern as will be explained in more detail in further embodiments to be described below.

Sample module 142 is then configured to repeat this process using the remaining specified sampling parameters (e.g., sampling parameters 125*b*, 125*c* and 125*d*) to determine an error count for these sampling parameters by the method described above. Sample module 142 may then be configured to record the number of errors for each of the sampling parameters 125 in an output record 141. In some embodiments, the output record 141 may be stored in a register 143 that is associated with optimization module 140, although this is not required as one of skill in the art will appreciate that output record 141 may be stored in other memory locations of network diagnostic component as well. In some embodiments, output record 141 may be an N×N matrix, although this is not required.

Figure 2A:
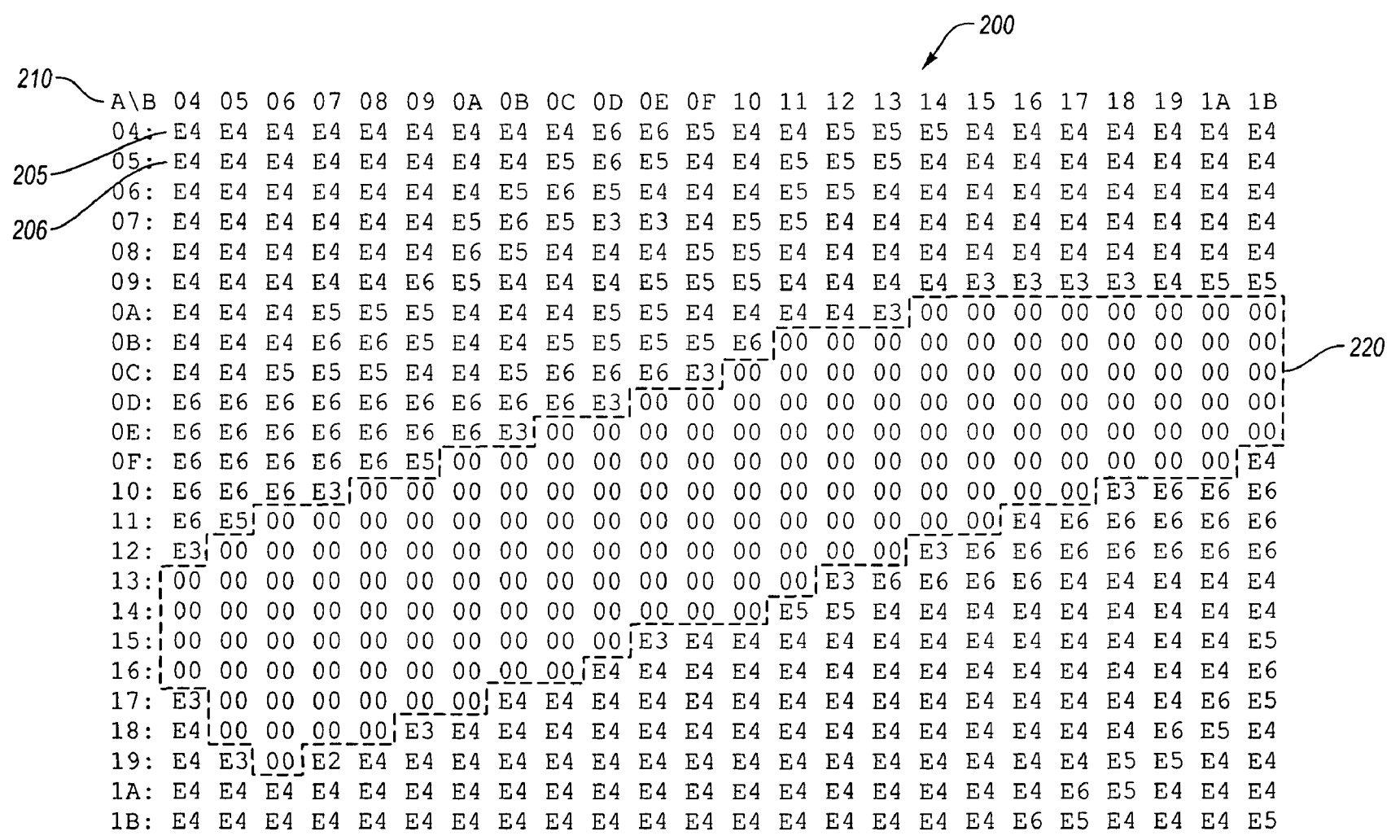

Turning now to FIG. 2A, a specific example 200 of an output record 141 created by the process just described is illustrated. As illustrated, output record 200 is in the form of an N×N matrix. As further illustrated, FIG. 2A includes the error count for various sampling parameters A and B, denoted at 210, that may correspond to sampling parameters 125*a*-125D. For example, FIG. 2A shows the error count 205 for sampling parameters A04, B04, which may correspond to sampling parameter 125*a*, the error count 306 for sampling parameters A05, B05, which may correspond to sampling parameter 125*b*, and so on. Note that in FIG. 2 (and FIG. 3), E3 means 10(exp)3 or 1000 errors, E4 is 10,000 errors, etc.

FIG. 2A also shows that there is a contour or region 220 of output record 200 where no errors were recorded for a signal sampled at the various sampling parameters 125 related to these zero error records.

Returning to FIG. 1, optimization module 140 also includes an operations module 144 that may be configured to apply an optimization solution to the output record 141 to determine the specific sampling parameters 125 that will cause SERDES 120 to output a signal with the lowest amount of errors. For example, in the present embodiment, operations module 144 may perform a weighted center of mass operation on the output record 141, specifically on the regions that contains no errors, such as region 220 of FIG. 2A. In this operation, operations module 144 applies the largest weight to those positions that produced zero errors with the following formula: weight=1.0/(val*val+1.0), where val is the number of errors at a given position. So a position with zero errors gets a weight of 1, and a position with 10,000 errors gets a very small weight. In this way, the center of the contour or region of zero errors, such as region 220, may quickly and easily be found. This center position is the actual position on output record 141 corresponding to the specific sampling parameters 125 that will cause SERDES 120 to output a signal with the lowest amount of errors.

Figure 2B:
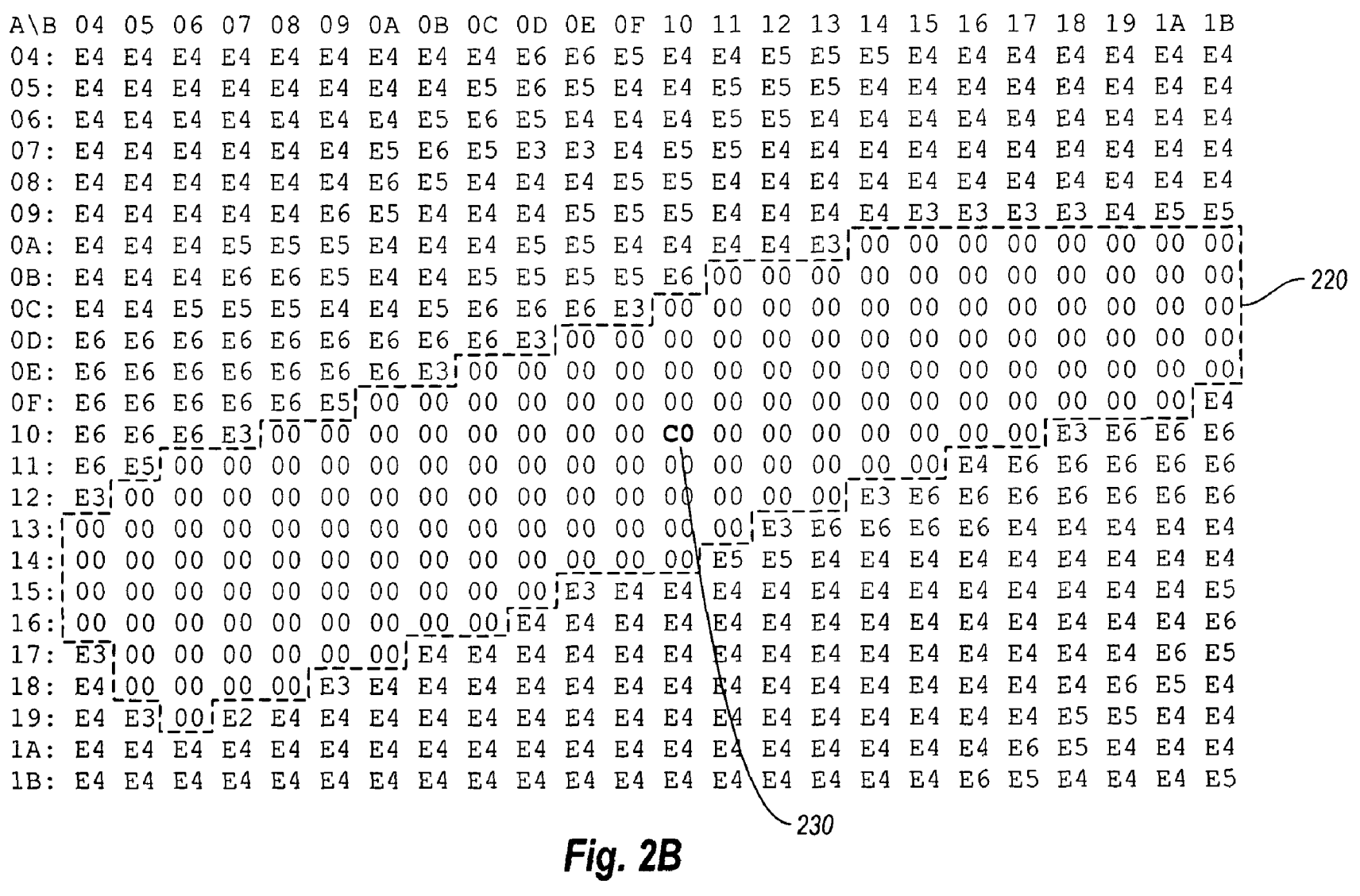

Turning now to FIG. 2B, the results of having operations module 144 perform the weighted center of mass operation on output record 200 is illustrated. As shown, operations module 144 has found that position (10, 10), denoted at 230, is at the center of contour or region 220. This position, which corresponds to sampling parameters A10 and B10, is marked as C0.

Optimization module 140 may then program SERDES 120 to use the sampling parameters 125 found by the optimization process. The sampling parameter 125 found by the optimization process may also then be stored in non-volatile memory 150 as record 155, which can later be accessed by SERDES 120. Accordingly, the sampling parameter 125 that is stored in record 155 will be available for later use by an end user in embodiments where the optimization process is performed by the network diagnostic component 110 manufacturers at manufacture time. Note that the optimization process may also be run on more that one signal pattern if so desired.

As mentioned, in some embodiments, the optimization process may be performed during operation of network diagnostic component 110. In such embodiments, a Graphical User Interface (GUI) 170, which may be any reasonable GUI, may be provided that allows an end user to activate the optimization process. In such cases, device 180 would typically be a network device that transmits various signal patterns to network diagnostic component 110. However, the optimization process would be performed by the various modules of optimization module 140 as explained.

Convolution Embodiment

In an alternate embodiment sample module 142 may be configured to direct SERDES 120 to receive the network traffic signal pattern provided by device 180 at first specified sampling parameters such as sampling parameters 125*a*. Sample module 142 then compares the actual signal pattern output by SERDES 120 with an expected network traffic signal pattern 152 output by SERDES 120 and determines an error count for the specific sampling parameters. The expected network signal pattern 152 may be stored in a non-volatile memory 150 or it may be accessed from a source alternative to network diagnostic component 110. The error count is then stored in a memory such as register 143 or some other memory such as non-volatile memory 150.

Sample module 142 is then configured to repeat this process using the remaining specified sampling parameters (e.g., sampling parameters 125*b*, 125*c* and 125*d*) to determine an error count for these sampling parameters by the method described above. These error counts are also stored in a memory such as the register 143. Accordingly, at the completion of the process, the total error count becomes a first output record 141 of the error count for each of the sampling parameters.

Figure 3A:
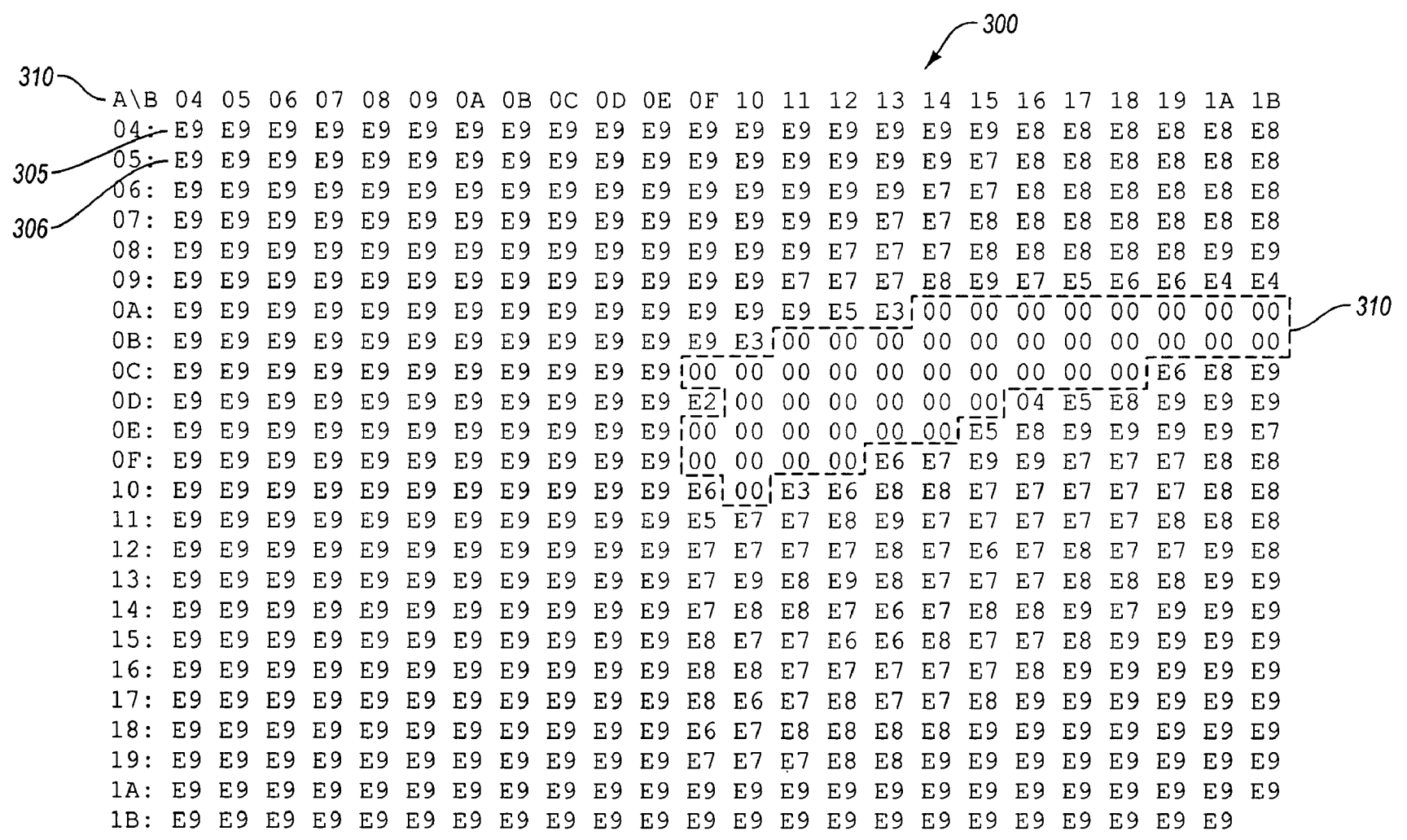
Figure 3B:
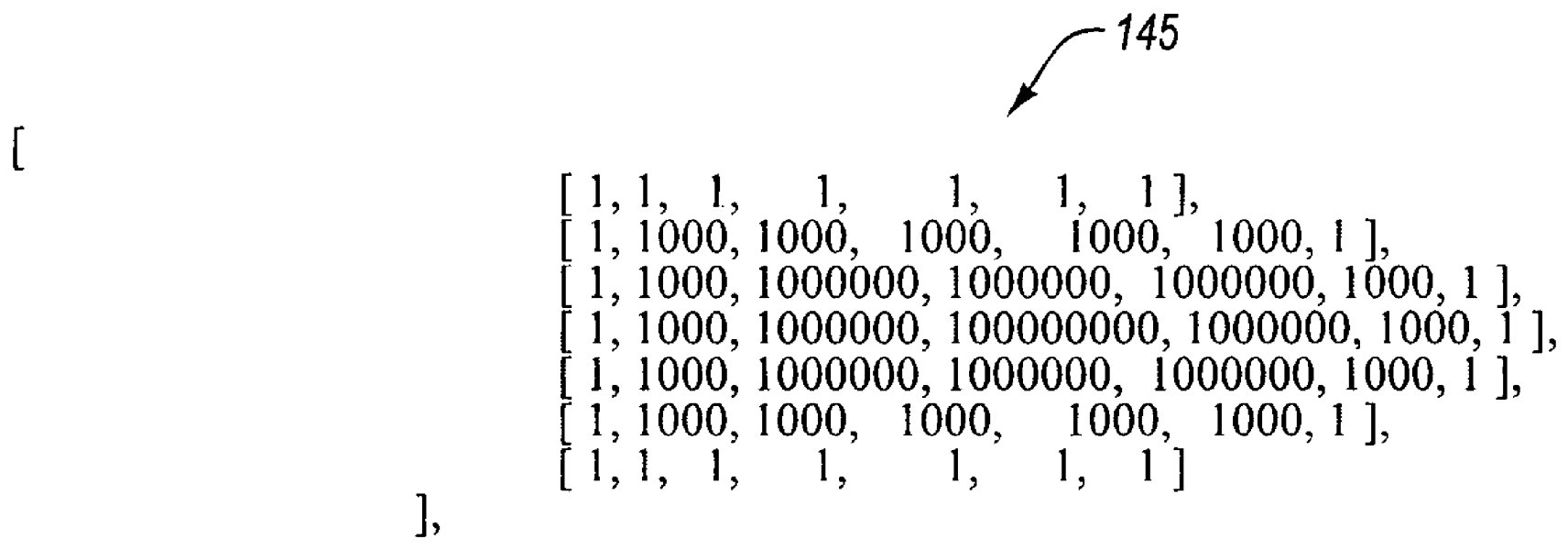

FIG. 3A, which in specific embodiment of an output record 141 created by the process just described, shows an output record 300. As illustrated, output record 300 is in the form of an N×N matrix. As further illustrated, FIG. 3A includes the error count for various sampling parameters A and B, denoted at 310, that may correspond to sampling parameters 125a-125D. For example, FIG. 3A shows the error count 305 for sampling parameters A04, B04, which may correspond to sampling parameter 125a, the error count 305 for sampling parameters A05, B05, which may correspond to sampling parameter 125b, and so on.

As mentioned in relation to the previously described embodiment, for a SERDES 120 that has good receive properties, there typically will be a grouping of sampling parameters 125 that contain zero errors. This is denoted by contour 310.

Having found an error count at each of the specified sampling parameters 125, it is then desirable to find which single sampling parameter will provide a signal with the lowest value of errors. As mentioned, there is a grouping 310 of parameters that have zero errors. Accordingly, optimization module 140, specifically operations module 144, may apply an optimization solution to the output record 141 to determine the specific sampling parameters 125 that will cause SERDES 120 to output a signal with the lowest amount of errors. For example, in the present embodiment, operations module 144 may perform a convolution operation on the output record 141.

In some embodiments, convolution module 144 may be configured to perform the convolution operation by using a convolution mask 145 that may be some desired size such as 3×3, 5×5, or 7×7. Of course one of skill in the art will appreciate that any reasonable convolution mask may be implemented as circumstances warrant. The convolution mask may be accessed by operations module 144 from a memory such as non-volatile memory 150 or some other reasonable source. In one specific embodiment, a 7×7 square convolution mask 145 is utilized as is shown FIG. 3B.

In operation, operations module 144 lays the convolution mask 145 over an arbitrary position of the specific embodiment of output record 141 seen in FIG. 3A. The record that corresponds to the mask position (3, 3) will be replaced as operations module 144 performs the operation. For example, each mask position is multiplied by its corresponding value in output record 300. All the products are then summed and the resulting value becomes the new value of the sample that corresponds to the mask position (3, 3). Note that mask position (3, 3) (index starts at zero) is biased the highest amount, and the values decrease the further they are from mask position (3, 3). This is intended to bias any samples in output record 300 that include errors. The purpose of the convolution process is to find which sample in output record 300 that included no errors is furthest from any sample that did include errors.

The values produced by operations module 144 are then placed in an output record 149, which may be stored in register 143 or some other reasonable location. FIG. 3C shows a specific embodiment of the output record 149, denoted at 350, produced by having operations module 144 convolve the mask 145 of FIG. 3B over the output record 300 illustrated in FIG. 3A. As illustrated, the specific sampling parameters 125 that will cause SERDES 120 to output a signal with the lowest amount of errors is found at A0d, B12, Value=17144.280153. The exact number is calculated but not shown in FIG. 3C for sake of clarity. The specific sampling parameters may then be stored as record 155 in non-volatile memory 150 as previously described.

Note that network diagnostic component 110 may also include a port or connector 116 that acts as a physical connection between network diagnostic component 110 and device 190 in those embodiments where network diagnostic component 110 is coupled to device 190. A SERDES 160, including sampling parameters 165, may be connected to connecter 116. In such cases, an optimization process for SERDES 160 may be performed as described in relation to SERDES 120.

Methods for Optimizing SERDES Sampling Parameters

Figure 4:
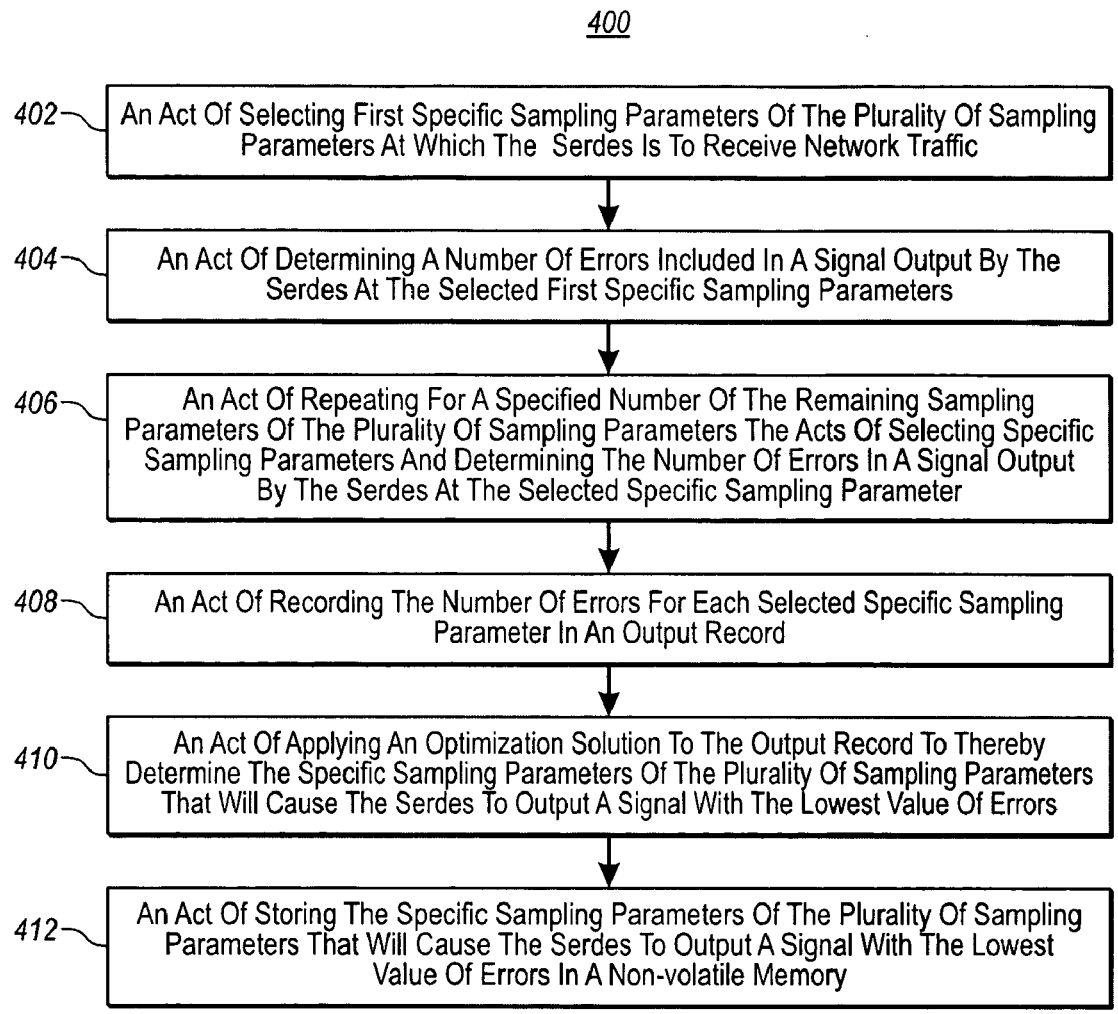
FIG. 4 illustrates a method for optimizing a plurality of sampling parameters of a Serializer/Deserializer (SERDES) included in the network diagnostic component of FIG. 1.

Referring now to FIG. 4, a flowchart of a method 400 for a plurality of sampling parameters of a SERDES included in a network diagnostic component is illustrated. Method 400 will be described in relation to the network system of FIG. 1, although this is not required. It will be appreciated that method 400 may be practiced in numerous network diagnostic systems. Note that although reference may be made to SERDES 120, the optimization method to now be discussed may also be applied to SERDES 160 or any other SERDES as circumstances warrant.

Method 400 includes an act of selecting first specific sampling parameters of the plurality of sampling parameters at which the SERDES is to receive network traffic (act 402). For example, optimization module 140, specifically sample module 142, may cause SERDES 120 to receive network traffic while implementing a first sampling parameter 125 such as parameter 125a.

Method 400 also includes an act of determining a number of errors included in a signal output by the SERDES at the selected first specific sampling parameters (act 404). For example, optimization module 140, specifically sample module 142, may in one embodiment compare the signal output by SERDES 120 while implementing the first specific sampling parameter with an expected signal output to determine the number of bits of the signal output by the SERDES that are different from the expected signal output. The number of bits comprises the error count.

In another embodiment, optimization module 140, specifically sample module 142, may determine if the received network traffic is compliant with a known code scheme for the communication protocol of the network traffic. In other words, if a code word arrives that does not have a valid entry in the code book, then an error is determined to have occurred. An error is also determined to have occurred if a running disparity error is found in the received network traffic.

Method 400 further includes an act of repeating for a specified number of the remaining sampling parameters of the plurality of sampling parameters the acts of selecting specific sampling parameters and determining the number of errors in a signal output by the SERDES at the selected specific sampling parameter, wherein the selected specific sampling parameters are different from previously selected specific sampling parameters (act 406). For example, optimization module 140 repeats the above acts for the remaining parameters 125 (i.e., sampling parameters 125b, 125c, and 125d).

Method 400 also includes an act of recording the number of errors for each selected specific sampling parameter in an output record (act 408). For example, optimization module 140, specifically sample module 142, may record the number of errors for each for each selected specific sampling parameter in an output record 141. As previously described, in some embodiments output record 141 may be an N×N matrix such as output records 200 and 300.

Method 400 further includes an act of applying an optimization solution to the output record to thereby determine the specific sampling parameters of the plurality of sampling parameters that will cause the SERDES to output a signal with the lowest value of errors (act 410). For example, optimization module 140, specifically operations module 144, may apply various optimization solutions to the output record 141 to determine the specific sampling parameters 125 that will cause SERDES 120 to output a signal with the lowest value of errors. As previously discussed, in some embodiments a weighted center of mass optimization solution may be applied, while in other embodiments a convolution optimization solution may be applied.

In some embodiments, method 400 may also include an act of storing the specific sampling parameters of the plurality of sampling parameters that will cause the SERDES to output a signal with the lowest value of errors in a non-volatile memory (act 412). For example, the specific sampling parameters 125 that will cause the SERDES 120 to output a signal with the lowest value of errors may be stored in non-volatile memory 150 as record 155 as previously discussed.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety Example Systems It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for optimizing a plurality of sampling parameters of a Serializer/Deserializer (SERDES) included in a network diagnostic component, the method comprising:
   an act of selecting first specific sampling parameters of the plurality of sampling parameters at which the SERDES is to receive network traffic, the plurality of sampling parameters including a sampling position of a clock for sampling the network traffic;
   an act of determining a number of errors included in a signal output by the SERDES at the selected first specific sampling parameters;
   an act of repeating for a specified number of the remaining sampling parameters of the plurality of sampling parameters the acts of selecting specific sampling parameters and determining the number of errors in a signal output by the SERDES at the selected specific sampling parameter, wherein the selected specific sampling parameters are different from previously selected specific sampling parameters;
   an act of recording the number of errors for each selected specific sampling parameter in an output record, and
   an act of applying a weighted center of mass optimization solution or a convolution optimization solution to the output record to thereby determine the specific sampling parameters of the plurality of sampling parameters that will cause the SERDES to output a signal with the lowest value of errors.

2. The method in accordance with claim 1, further comprising:
   an act of storing the specific sampling parameters of the plurality of sampling parameters that will cause the SERDES to output a signal with the lowest value of errors in a non-volatile memory.

3. The method in accordance with claim 1, wherein the act of determining a number of errors included in a signal output by the SERDES at the first sampling parameters comprises:
   an act of determining if network traffic received at the SERDES is compliant with a known code scheme associated with the received network traffic.

4. The method in accordance with claim 1, wherein applying a weighted center of mass optimization solution or a convolution optimization solution to the output record to thereby determine the specific sampling parameters of the plurality of sampling parameters that will cause the SERDES to output a signal with the lowest value of errors comprises:
   an act of performing an operation to determine a center of a region of the output record containing zero errors, the specific sampling parameters at the center of the region being the specific sampling parameters of the plurality of sampling parameters that will cause the SERDES to output a signal with the lowest value of errors.

5. The method in accordance with claim 1, wherein applying a weighted center of mass optimization solution or a convolution optimization solution to the output record to thereby determine the specific sampling parameters of the plurality of sampling parameters that will cause the SERDES to output a signal with the lowest value of errors comprises:
   an act of performing a convolution operation on the output record to produce a second output record for the specified number of sampling parameters; and
   an act of searching the second output record to determine the specific sampling parameters of the plurality of sampling parameters that will cause the SERDES to output a signal with the lowest value of errors.

6. The method in accordance with claim 1, wherein the output record is an N×N matrix.

7. The method in accordance with claim 1, wherein the SERDES provides the signal with the lowest value of errors to diagnostic logic of the network diagnostic component.

8. The method in accordance with claim 1, wherein the network diagnostic component is one of a protocol or network analyzer, a bit error rate tester, a generator, a monitor, a load tester, or a jammer.

9. The method in accordance with claim 1, wherein the method is performed by a manufacturer of the network diagnostic component.

10. A network diagnostic component placed in-line between first and second nodes in a network comprising a Serializer/Deserializer (SERDES) that includes a plurality of sampling parameters, the network diagnostic component further comprising:

one or more modules configured to:
select first specific sampling parameters of the plurality of sampling parameters at which the SERDES is to receive network traffic, the plurality of sampling parameters including a sampling position of a clock for sampling the network traffic;
determine a number of errors included in a signal output by the SERDES at the selected first specific sampling parameters;
repeat for a specified number of the remaining sampling parameters of the plurality of sampling parameters the steps of selecting specific sampling parameters and determining the number of errors in a signal output by the SERDES at the selected specific sampling parameter, wherein the selected specific sampling parameters are different from previously selected specific sampling parameters;
record the number of errors for each selected specific sampling parameter in an output record, and
apply weighted center of mass optimization solution or a convolution optimization solution to the output record to thereby determine the specific sampling parameters of the plurality of sampling parameters that will cause the SERDES to output a signal with the lowest value of errors.

11. The network diagnostic component in accordance with claim 10, further comprising:
a non-volatile memory wherein the specific sampling parameters of the plurality of sampling parameters that will cause the SERDES to output a signal with the lowest value of errors are stored.

12. The network diagnostic component in accordance with claim 10, wherein the one or more modules select first specific sampling parameters of the plurality of sampling parameters of the SERDES by determining if network traffic received at the SERDES is compliant with a known code scheme associated with the received network traffic.

13. The network diagnostic component in accordance with claim 10, wherein the one or more modules apply a weighted center of mass optimization solution or a convolution optimization solution to the output record to thereby determine the specific sampling parameters of the plurality of sampling parameters that will cause the SERDES to output a signal with the lowest value of errors by:
performing an operation to determine a center of a region of the output record containing zero errors, the specific sampling parameters at the center of the region being the specific sampling parameters of the plurality of sampling parameters that will cause the SERDES to output a signal with the lowest value of errors.

14. The network diagnostic component in accordance with claim 10, wherein the one or more modules apply a weighted center of mass optimization solution or a convolution optimization solution to the output record to thereby determine the specific sampling parameters of the plurality of sampling parameters that will cause the SERDES to output a signal with the lowest value of errors by:
performing a convolution operation on the first output record to produce a second output record for the specified number of sampling parameters; and
searching the second output record to determine the specific sampling parameters of the plurality of sampling parameters that will cause the SERDES to output a signal with the lowest value of errors.

15. The network diagnostic component in accordance with claim 10, wherein the output record is an N×N matrix.

16. The network diagnostic component in accordance with claim 10 further comprising diagnostic logic, wherein the SERDES provides the signal with the lowest value of errors to the diagnostic logic.

17. The network diagnostic component in accordance with claim 10, wherein the network diagnostic component is one of a protocol or network analyzer, a bit error rate tester, a generator, a monitor, a load tester, or a jammer.

18. The network diagnostic component in accordance with claim 10, wherein the network diagnostic component further includes a Graphical User Interface configured to receive user input that cause the one or more modules of the network diagnostic component to apply the optimization solution to the output record.

19. A network diagnostic component placed in-line between first and second nodes in a network comprising a Serializer/Deserializer (SERDES) that includes a plurality of sampling parameters, the network diagnostic component further comprising:
means for selecting first specific sampling parameters of the plurality of sampling parameters at which the SERDES is to receive network traffic, the plurality of sampling parameters including a sampling position of a clock for sampling the network traffic;
means for determining a number of errors included in a signal output by the SERDES at the selected first specific sampling parameters;
means for repeating for a specified number of the remaining sampling parameters of the plurality of sampling parameters the steps of selecting specific sampling parameters and determining the number of errors in a signal output by the SERDES at the selected specific sampling parameter, wherein the selected specific sampling parameters are different from previously selected specific sampling parameters;
means for recording the number of errors for each selected specific sampling parameter in an output record, and
means for applying a weighted center of mass optimization solution or a convolution optimization solution to the output record to thereby determine the specific sampling parameters of the plurality of sampling parameters that will cause the SERDES to output a signal with the lowest value of errors.

20. The network diagnostic component in accordance with claim 19, wherein the network diagnostic component is one of a protocol or network analyzer, a bit error rate tester, a generator, a monitor, a load tester, or a jammer.

* * * * *